(12) United States Patent
Sainath et al.

(10) Patent No.: US 12,361,927 B2
(45) Date of Patent: Jul. 15, 2025

(54) EMITTING WORD TIMINGS WITH END-TO-END MODELS

(71) Applicant: Google LLC, Mountain View, CA (US)

(72) Inventors: Tara N. Sainath, Jersey City, NJ (US); Basilio Garcia Castillo, Mountain View, CA (US); David Rybach, Munich (DE); Trevor Strohman, Mountain View, CA (US); Ruoming Pang, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/680,797

(22) Filed: May 31, 2024

(65) Prior Publication Data

US 2024/0321263 A1    Sep. 26, 2024

Related U.S. Application Data

(63) Continuation of application No. 18/167,050, filed on Feb. 9, 2023, now Pat. No. 12,027,154, which is a
(Continued)

(51) Int. Cl.
  *G10L 25/30*    (2013.01)
  *G10L 15/06*    (2013.01)
  *G10L 25/78*    (2013.01)

(52) U.S. Cl.
  CPC ............ *G10L 15/063* (2013.01); *G10L 25/30* (2013.01); *G10L 25/78* (2013.01)

(58) Field of Classification Search
  CPC ................................ G10L 25/30; G10L 25/78
(Continued)

(56) References Cited

U.S. PATENT DOCUMENTS 3,535,457 A * 10/1970 Poschenrieder ....... H04Q 11/04
                                                             370/364
6,822,589 B1 * 11/2004 Dye ...................... H04N 19/42
                                                              341/51
(Continued)

OTHER PUBLICATIONS

A. Gandhe and A. Rastrow, "Audio-Attention Discriminative Language Model for ASR Rescoring," ICASSP 2020—2020 IEEE International Conference on Acoustics, Speech and Signal Processing (ICASSP), Barcelona, Spain, 2020, pp. 7944-7948, doi: 10.1109/ICASSP40776.2020.9054335. keywords: {Hidden Markov mod (Year: 2020).*

(Continued)

*Primary Examiner* — Bharatkumar S Shah
(74) *Attorney, Agent, or Firm* — Honigman LLP; Brett A. Krueger; Grant Griffith

(57) ABSTRACT

A method includes receiving a training example that includes audio data representing a spoken utterance and a ground truth transcription. For each word in the spoken utterance, the method also includes inserting a placeholder symbol before the respective word identifying a respective ground truth alignment for a beginning and an end of the respective word, determining a beginning word piece and an ending word piece, and generating a first constrained alignment for the beginning word piece and a second constrained alignment for the ending word piece. The first constrained alignment is aligned with the ground truth alignment for the beginning of the respective word and the second constrained alignment is aligned with the ground truth alignment for the ending of the respective word. The method also includes constraining an attention head of a second pass decoder by applying the first and second constrained alignments.

20 Claims, 8 Drawing Sheets

Related U.S. Application Data continuation of application No. 17/204,852, filed on Mar. 17, 2021, now Pat. No. 11,580,956.

(60) Provisional application No. 63/021,660, filed on May 7, 2020.

(58) Field of Classification Search
USPC .......................................................... 704/200
See application file for complete search history.

(56) References Cited

U.S. PATENT DOCUMENTS

| | | | |
|---|---|---|---|
| 10,706,840 B2* | 7/2020 | Sak | G10L 15/14 |
| 2006/0053004 A1* | 3/2006 | Ceperkovic | H04N 19/1883 704/221 |
| 2014/0007250 A1* | 1/2014 | Stefanov | G06F 21/60 726/26 |
| 2017/0148226 A1* | 5/2017 | Zhang | G06T 7/001 |
| 2018/0107925 A1* | 4/2018 | Choi | G06F 17/16 |
| 2019/0393903 A1* | 12/2019 | Mandt | H03M 7/30 |
| 2020/0184278 A1* | 6/2020 | Zadeh | G06N 3/044 |
| 2021/0064822 A1* | 3/2021 | Velikovich | G10L 15/083 |
| 2021/0089863 A1* | 3/2021 | Yang | G06N 3/063 |
| 2021/0312905 A1* | 10/2021 | Zhao | G10L 15/16 |
| 2021/0350794 A1* | 11/2021 | Sainath | G06N 3/044 |
| 2022/0083743 A1* | 3/2022 | Chiu | G06N 3/084 |

OTHER PUBLICATIONS

P. Serai, A. Stiff and E. Fosler-Lussier, "End to End Speech Recognition Error Prediction with Sequence to Sequence Learning," ICASSP 2020—2020 IEEE International Conference on Acoustics, Speech and Signal Processing (ICASSP), Barcelona, Spain, 2020, pp. 6339-6343, doi: 10.1109/ICASSP40776.2020.905 (Year: 2020).*

International Search Report for the related Application No. PCT/US2021/022851, Dated Jul. 15, 2021.

Tara N . Sainath et al : "Two-Pass End-to-End Speech Recognition", arxv.org, Cornell University Library, 201 Olin Library Cornell University Ithaca, NY 14853, Aug. 29, 2019 (Aug. 29, 2019), XP081489070, p. 1, paragraph 1—p. 2, paragraph 3 p. 3, l eft-hand col umn, paragraph 3.2 p. 3, paragraph 4.2—p. 4, paragraph 4.3.

Li Bo et al: 11 Towards Fast and Accurate Streaming End-To-End ASR 11, ICASSP 2020—2020 IEEE International Conference on Acoustics, Speech and Signal Processing (I CASSP), I EEE, May 4, 2020 (May 4, 2020), pp. 6069-6073, XP033794369, DOI: 10.1109/ICASSP40776.2020.9054715 [retrieved on Apr. 1, 2020] abstract p. 6069, left-hand column, paragraph 1—right-hand column, paragraph 5.

Sainath Tara N et al: 11 An Attention-Based Joint Acoustic and Text on-Device End-To-End Model , ICASSP 2020—2020 IEEE International Conference on Acoustics, Speech and Signal Processing (ICASSP), IEEE, May 4, 2020 (May 4, 2020), pp. 7039-7043, XP033793174, DOI: 10.1109/ICASSP40776.2020.9053510 [retri eved on Apr. 1, 2020] p. 6070, paragraph 2—right-hand column, paragraph 3, p. 6071, paragraph 3.2, p. 6072, paragraph 4.4—p. 6073, paragraph 4.5.

Sainath Tara N. et al: "Emitting Word Timings with End-to-End Models", INTERSPEECH 2020, [Online] Oct. 25, 202 (Oct. 25, 2020), pp. 3615-3619, XP055817592, ISCA, DOI: 10.21437/Interspeech. 2020-1059. Retrieved from the Internet: URL :https ://i sca-speech. org/archi ve/Interspeech 2020/pdfs/1059.pdf> [retrieved on Jun. 24, 2021].

Chinese Office Action for application No. 201880027521.2 dated Dec. 5, 2022.

P. Bell and S. Renals, "A system for automatic alignment of broadcast media captions using weighted finite-state transducers," 2015 IEEE Workshop on Automatic Speech Recognition and Understanding (ASRU), 2015, pp. 675-680, doi: 10.1109/ASRU .2015. 7404861. (Year: 2015) (Year: 2015) (Year: 2015) (Year: 2015).

H. Hu, R. Zhao, J. Li, L. Lu and Y. Gong, "Exploring Pre-Training with Alignments for RNN Transducer Based End-to-End Speech Recognition," ICASSP 2020—2020 IEEE International Conference on Acoustics, Speech and Signal Processing (ICASSP), 2020, pp. 7079-7083, doi: 10.1109/ICASSP40776.2020.9054663. (Year: 2020).

T. Afouras, J. S. Chung, A. Senior, O. Vinyals and A. Zisserman, "Deep Audio-Visual Speech Recognition," in IEEE Transactions on Pattern Analysis and Machine Intelligence, vol. 44, No. 12, pp. 8717-8727, Dec. 1, 2022, doi: 10.1109/TPAMI.2018.2889052. keywords: {Hidden Markov models; Lips;Speech recogni (Year: 2022).

USPTO. Office Action relatiing U.S. Appl. No. 18/167,050, dated Nov. 24, 2024.

* cited by examiner

EMITTING WORD TIMINGS WITH END-TO-END MODELS

CROSS REFERENCE TO RELATED APPLICATIONS

This U.S. patent application is a continuation of, and claims priority under 35 U.S.C. § 120 from, U.S. patent application Ser. No. 18/167,050, filed on Feb. 9, 2023, which is a continuation of U.S. patent application Ser. No. 17/204,852, filed on Mar. 17, 2021, which claims priority under 35 U.S.C. § 119 (e) to U.S. Provisional Application 63/021,660, filed on May 7, 2020. The disclosures of these prior applications are considered part of the disclosure of this application and are hereby incorporated by reference in their entireties.

TECHNICAL FIELD

This disclosure relates to two-pass end-to-end speech recognition.

BACKGROUND

Modern automated speech recognition (ASR) systems focus on providing not only high quality (e.g., a low word error rate (WER)), but also low latency (e.g., a short delay between the user speaking and a transcription appearing). Moreover, when using an ASR system today there is a demand that the ASR system decode utterances in a streaming fashion that corresponds to real-time or even faster than real-time. To illustrate, when an ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the disclosure provides a computer-implemented method when executed on data processing hardware causes the data processing hardware to perform operations that include receiving a training example for a second pass decoder of a two-pass neural network model. The training example includes audio data representing a spoken utterance of one or more words and a corresponding ground truth transcription of the spoken utterance. For each word in the spoken utterance, the operations also include: inserting a placeholder symbol before the respective word; identifying a respective ground truth alignment for a beginning of the respective word and an end of the respective word; determining a beginning word piece of the respective word and an ending word piece of the respective word; and generating a first constrained alignment for the beginning word piece of the respective word and a second constrained alignment for the ending word piece of the respective word. The first constrained alignment is aligned with the ground truth alignment for the beginning of the respective word and the second constrained alignment is aligned with the ground truth alignment for the ending of the respective word. The operations also include constraining an attention head of the second pass decoder of the two-pass neural network model by applying the training example that includes all of the first constrained alignments and the second constrained alignments for each word of the training example.

Implementations of the disclosure may include one or more of the following optional features. In some implementations, the operations further include, while training the second pass decoder on the training example: identifying an expected attention probability for portions of the training example; determining that the constrained attention head generates an attention probability for at least one of the portions of the training example that fails to match the expected attention probability; and applying a training penalty to the constrained attention head. In these implementations, the attention probability for the at least one of the portions of the training example may occur at a time corresponding to either the first constrained alignment or the second constrained alignment. On the other hand, the attention probability for the at least one of the portions of the training example may optionally occur at a time corresponding to neither the first constrained alignment nor the second constrained alignment.

The beginning word piece and the ending word piece may include a same word piece for the respective word, while the second pass decoder may include a plurality of attention heads. In some examples, constraining the attention head includes constraining an attention probability derived from the attention head of the second pass decoder. Each respective constrained alignment may include a timing buffer about the respective ground truth alignment. Here, the timing buffer constrains each of the first constrained alignment and the second constrained alignment to a time interval that includes a first period of time before the respective ground truth alignment and a second period of time after the respective ground truth alignment.

In some examples, the operations further include, while training the second pass decoder on the training example: determining that the constrained attention head generates a non-zero attention probability outside of boundaries corresponding to the first constrained alignment and the second constrained alignment; and applying a training penalty to the constrained attention head. Additionally or alternatively, the operations may further include, while training the second pass decoder on the training example: minimizing an attention loss for the constrained attention head; and minimizing a cross entropy loss for the second pass decoder. During execution of the two-pass neural network while using the second pass decoder trained on the training example, in some additional examples, the operations further include receiving audio data of an utterance, determining a time corresponding to a maximum probability at the constrained attention head of the second pass decoder, and generating a word start time or a word end time for the determined time corresponding to a maximum probability at the constrained attention head of the second pass decoder.

Another aspect of the disclosure provides a system that includes data processing hardware and memory hardware in communication with the data processing hardware. The memory hardware stores instructions that when executed by the data processing hardware causes the data processing hardware to perform operations that include receiving a training example for a second pass decoder of a two-pass neural network model. The training example includes audio data representing a spoken utterance of one or more words and a corresponding ground truth transcription of the spoken utterance. For each word in the spoken utterance, the operations also include: inserting a placeholder symbol before the respective word; identifying a respective ground truth alignment for a beginning of the respective word and an end of the respective word; determining a beginning word piece of the respective word and an ending word piece of the respective word; and generating a first constrained alignment for the beginning word piece of the respective word and a second constrained alignment for the ending word piece of the respective word. The first constrained alignment is aligned with the ground truth alignment for the beginning of the respective word and the second constrained alignment is aligned with the ground truth alignment for the ending of the respective word. The operations also include constraining an attention head of the second pass decoder of the two-pass neural network model by applying the training example that includes all of the first constrained alignments and the second constrained alignments for each word of the training example.

This aspect may include one or more of the following optional features. In some implementations, the operations further include, while training the second pass decoder on the training example: identifying an expected attention probability for portions of the training example; determining that the constrained attention head generates an attention probability for at least one of the portions of the training example that fails to match the expected attention probability; and applying a training penalty to the constrained attention head. In these implementations, the attention probability for the at least one of the portions of the training example may occur at a time corresponding to either the first constrained alignment or the second constrained alignment. On the other hand, the attention probability for the at least one of the portions of the training example may optionally occur at a time corresponding to neither the first constrained alignment nor the second constrained alignment.

The beginning word piece and the ending word piece may include a same word piece for the respective word, while the second pass decoder may include a plurality of attention heads. In some examples, constraining the attention head includes constraining an attention probability derived from the attention head of the second pass decoder. Each respective constrained alignment may include a timing buffer about the respective ground truth alignment. Here, the timing buffer constrains each of the first constrained alignment and the second constrained alignment to a time interval that includes a first period of time before the respective ground truth alignment and a second period of time after the respective ground truth alignment.

In some examples, the operations further include, while training the second pass decoder on the training example: determining that the constrained attention head generates a non-zero attention probability outside of boundaries corresponding to the first constrained alignment and the second constrained alignment; and applying a training penalty to the constrained attention head. Additionally or alternatively, the operations may further include, while training the second pass decoder on the training example: minimizing an attention loss for the constrained attention head; and minimizing a cross entropy loss for the second pass decoder. During execution of the two-pass neural network while using the second pass decoder trained on the training example, in some additional examples, the operations further include receiving audio data of an utterance, determining a time corresponding to a maximum probability at the constrained attention head of the second pass decoder, and generating a word start time or a word end time for the determined time corresponding to a maximum probability at the constrained attention head of the second pass decoder.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
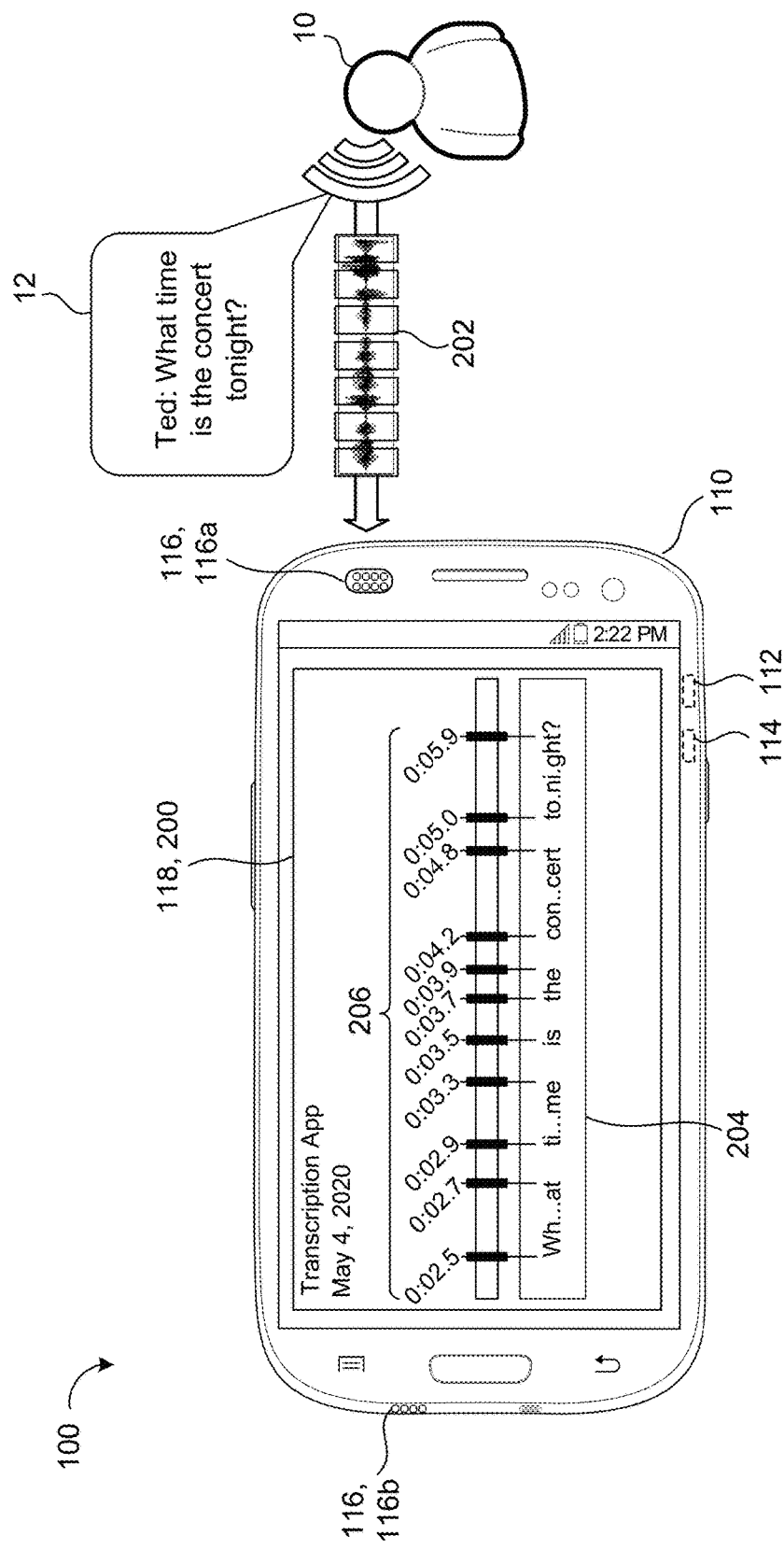
FIGS. 1A-1C are schematic views of example speech environments using a two-pass architecture with a joint acoustic and text model.

Speech recognition continues to evolve to meet the untethered and the nimble demands of a mobile environment. New speech recognition architectures or improvements to existing architectures continue to be developed that seek to increase the quality of automatic speech recognition systems (ASR). To illustrate, speech recognition initially employed multiple models where each model had a dedicated purpose. For instance, an ASR system included an acoustic model (AM), a pronunciation model (PM), and a language model (LM). The acoustic model mapped segments of audio (i.e., frames of audio) to phonemes. The pronunciation model connected these phonemes together to form words while the language model was used to express the likelihood of given phrases (i.e., the probability of a sequence of words). Yet although these individual models worked together, each model was trained independently and often manually designed on different datasets.

The approach of separate models enabled a speech recognition system to be fairly accurate, especially when the training corpus (i.e., body of training data) for a given model caters to the effectiveness of the model, but needing to independently train separate models introduced its own complexities and led to an architecture with integrated models. These integrated models sought to use a single neural network to directly map an audio waveform (i.e., input sequence) to an output sentence (i.e., output sequence). This resulted in a sequence-to-sequence approach, which generated a sequence of words (or graphemes) when given a sequence of audio features. Examples of sequence-to-sequence models include "attention-based" models and "listen-attend-spell" (LAS) models. A LAS model transcribes speech utterances into characters using a listener component, an attender component, and a speller component. Here, the listener is a recurrent neural network (RNN) encoder that receives an audio input (e.g., a time-frequency representation of speech input) and maps the audio input to a higher-level feature representation. The attender attends to the higher-level feature to learn an alignment between input features and predicted subword units (e.g., a grapheme or a wordpiece) or other units of speech (e.g., phonemes, phones, senomes). The speller is an attention-based RNN decoder that generates character sequences from the input by producing a probability distribution over a set of hypothesized words. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

Although early E2E models proved accurate and a training improvement over individually trained models, these E2E models, such as the LAS model, functioned by reviewing an entire input sequence before generating output text, and thus, did not allow streaming outputs as inputs were received. Without streaming capabilities, an LAS model is unable to perform real-time voice transcription. Due to this deficiency, deploying the LAS model for speech applications that are latency sensitive and/or require real-time voice transcription may pose issues. This makes an LAS model alone not an ideal model for mobile technology (e.g., mobile phones) that often relies on real-time applications (e.g., real-time communication applications).

Additionally, speech recognition systems that have acoustic, pronunciation, and language models, or such models composed together, may rely on a decoder that has to search a relatively large search graph associated with these models. With a large search graph, it is not conducive to host this type of speech recognition system entirely on-device. Here, when a speech recognition system is hosted "on-device," a device that receives the audio input uses its processor(s) to execute the functionality of the speech recognition system. For instance, when a speech recognition system is hosted entirely on-device, the processors of the device do not need to coordinate with any off-device computing resources to perform the functionality of the speech recognition system. A device that performs speech recognition not entirely on-device relies on remote computing (e.g., of a remote computing system or cloud computing) and therefore online connectivity to perform at least some function of the speech recognition system. For example, a speech recognition system performs decoding with a large search graph using a network connection with a server-based model.

Unfortunately, being reliant upon a remote connection makes a speech recognition system vulnerable to latency issues and/or inherent unreliability of communication networks. To improve the usefulness of speech recognition by avoiding these issues, speech recognition systems again evolved into a form of a sequence-to-sequence model known as a recurrent neural network transducer (RNN-T). A RNN-T does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and able to run offline (i.e., without a network connection); therefore, avoiding unreliability issues with communication networks.

In addition to speech recognition systems operating with low latency, a speech recognition system also needs to be accurate at recognizing speech. Often for models that perform speech recognition, a metric that may define an accuracy of a model is a word error rate (WER). A WER refers to a measure of how many words are changed compared to a number of words actually spoken. Commonly, these word changes refer to substitutions (i.e., when a word gets replaced), insertions (i.e., when a word is added), and/or deletions (i.e., when a word is omitted). To illustrate, a speaker says "car," but an ASR system transcribes the word "car" as "bar." This is an example of a substitution due to phonetic similarity. When measuring the capability of an ASR system compared to other ASR systems, the WER may indicate some measure of improvement or quality capability relative to another system or some baseline.

Although an RNN-T model shows promise as a strong candidate model for on-device speech recognition, the RNN-T model alone still lags behind a large state-of-the-art conventional model (e.g., a server-based model with separate AM, PM, and LMs) in terms of quality (e.g., speech recognition accuracy). Yet a non-streaming E2E, LAS model has speech recognition quality that is comparable to large state-of-the-art conventional models. To capitalize on the quality of a non-steaming E2E LAS model, a two-pass speech recognition system (e.g., shown in FIG. 2A) developed that includes a first-pass component of an RNN-T network followed by a second-pass component of a LAS network. With this design, the two-pass model benefits from the streaming nature of an RNN-T model with low latency while improving the accuracy of the RNN-T model through the second-pass incorporating the LAS network. Although the LAS network increases the latency when compared to only a RNN-T model, the increase in latency is reasonably slight and complies with latency constraints for on-device operation. With respect to accuracy, a two-pass model achieves a 17-22% WER reduction when compared to a RNN-T alone and has a similar WER when compared to a large conventional model.

Unfortunately, this two-pass model with an RNN-T network first pass and a LAS network second pass has some deficiencies. For instance, this type of two-pass model is generally not capable of conveying a timing for words (e.g., a start time or an end time for each word) because the two-pass model is not trained with alignment information like a conventional model. Without alignment information, the two-pass model often may delay its output predictions making it difficult to determine the timing of words. In contrast, conventional models are trained with alignment information, such as phoneme alignment or word alignment, that allows a conventional model to generate accurate word timings. This poses a tradeoff for a user of a speech recognition system. On one hand, the two-pass model has the benefits that it occurs on-device offering privacy and minimal latency, but without the capability of emitting word timings. On the other hand, the large conventional model can generate accurate word timings, but is too large to be implemented on-device forcing the user to use a remote-based, non-streaming speech recognition system with the potential of increased latency (e.g., compared to the two-pass model).

In order for the two-pass model to emit word timings while not compromising latency or loss in quality, the two-pass model may be adapted to capitalize on its own architecture with additional constraints. Stated differently, the two-pass model cannot incorporate elements of the large conventional model based on size constraints for the two-pass model to fit on-device nor can the two-pass model increase its overall latency by using a post-processing module after it generates a final hypothesis. Fortunately, while training the LAS network of the second pass, the attention probabilities for the LAS network learn an alignment between the audio corresponding to training examples and predicted sub-word units (e.g., graphemes, wordpieces, etc.) for the training examples. By constraining the attention probabilities of the LAS network based on word level alignments, the two-pass model may generate a start time and an end time for each word. With these word timings, the user may use the two-pass model on-device with various applications, such as a voice assistant, a dictation application, or video transcription.

Figure 1B:
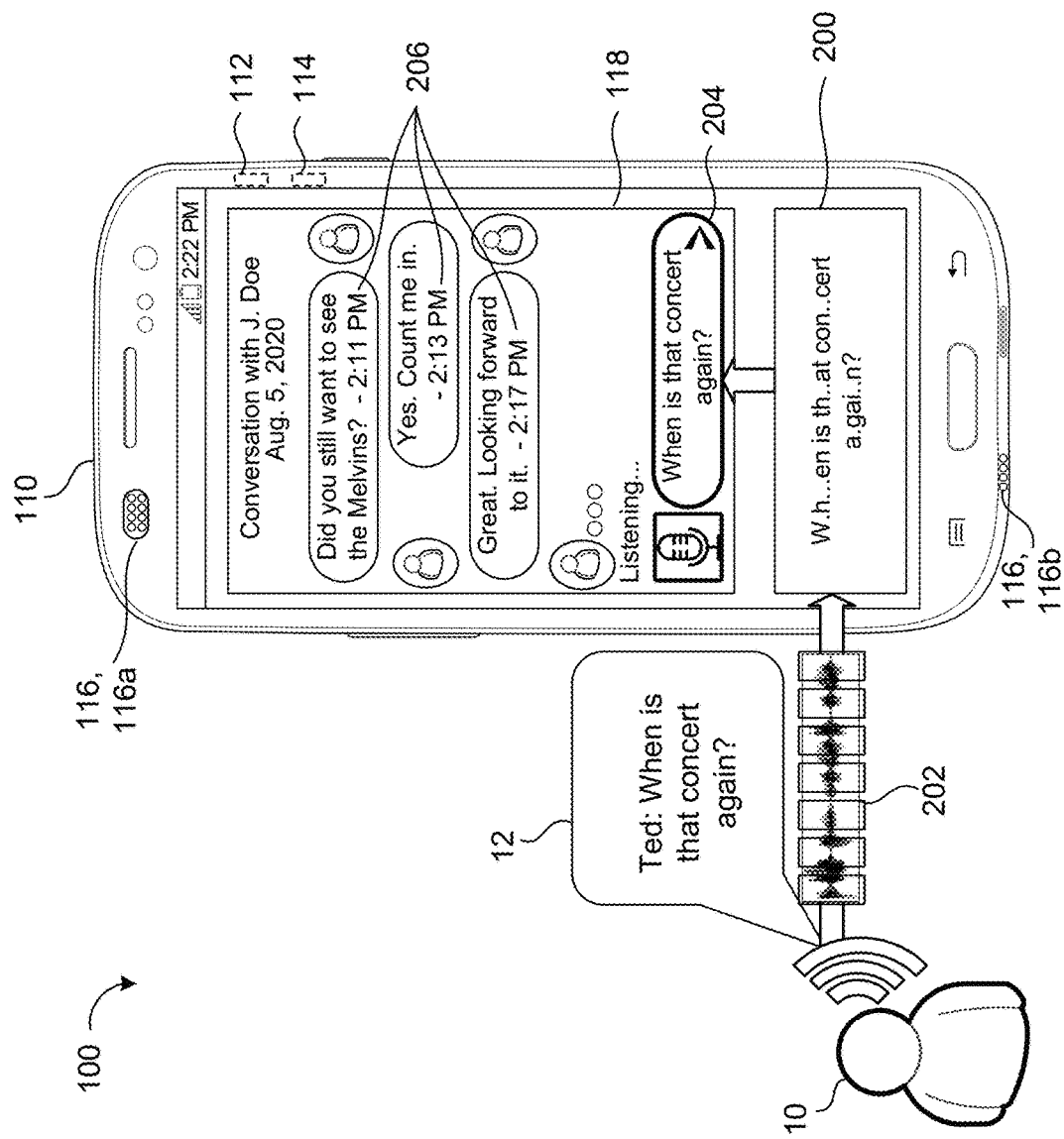
Figure 1C:
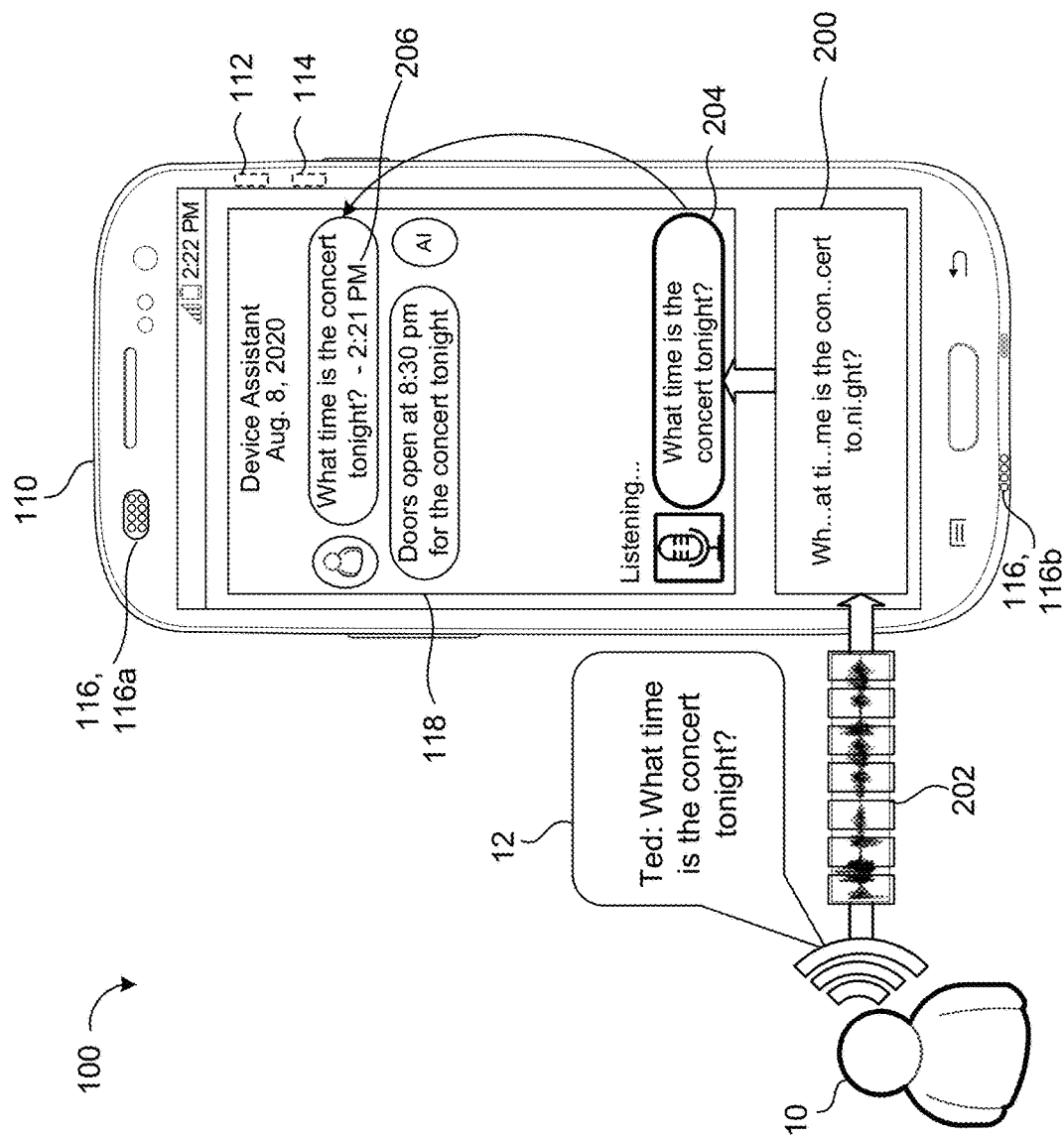

FIGS. 1A-1C are examples of a speech environment 100. In the speech environment 100, a user's 10 manner of interacting with a computing device, such as a user device 110, may be through voice input. The user device 110 (also referred to generally as a device 110) is configured to capture sounds (e.g., streaming audio data) from one or more users 10 within the speech-enabled environment 100. Here, the streaming audio data 202 may refer to a spoken utterance 12 by the user 10 that functions as an audible query (e.g., FIG. 1C), a command for the device 110, or an audible communication captured by the device 110 (e.g., FIG. 1B). Speech-enabled systems of the device 110 may field the query or the command by answering the query and/or causing the command to be performed.

Here, the user device 110 captures the audio data 202 of a spoken utterance 12 by the user 10. The user device 110 may correspond to any computing device associated with a user 10 and capable of receiving audio data 202. Some examples of user devices 110 include, but are not limited to, mobile devices (e.g., mobile phones, tablets, laptops, etc.), computers, wearable devices (e.g., smart watches), smart appliances, internet of things (IoT) devices, smart speakers, etc. The user device 110 includes data processing hardware 112 and memory hardware 114 in communication with the data processing hardware 112 and storing instructions, that when executed by the data processing hardware 112, cause the data processing hardware 112 to perform one or more operations. The user device 110 further includes an audio subsystem 116 with an audio capture device (e.g., microphone) 116, 116a for capturing and converting spoken utterances 12 within the speech-enabled system 100 into electrical signals and a speech output device (e.g., a speaker) 116, 116b for communicating an audible audio signal (e.g., as output audio data from the device 110). While the user device 110 implements a single audio capture device 116a in the example shown, the user device 110 may implement an array of audio capture devices 116a without departing from the scope of the present disclosure, whereby one or more capture devices 116a in the array may not physically reside on the user device 110, but be in communication with the audio subsystem 116.

The user device 110 (e.g., using the hardware 112, 114) is further configured to perform speech recognition processing on the streaming audio data 202 using a speech recognizer 200. In some examples, the audio subsystem 116 of the user device 110 that includes the audio capture device 116a is configured to receive audio data 202 (e.g., spoken utterances 12) and to convert the audio data 202 into a digital format compatible with the speech recognizer 200. The digital format may correspond to acoustic frames (e.g., parameterized acoustic frames), such as mel frames. For instance, the parameterized acoustic frames correspond to log-mel fiterbank energies.

In some implementations, such as FIG. 1A, the user 10 interacts with a program or application 118 of the user device 110 that uses the speech recognizer 200. For instance, FIG. 1A depicts the user 10 communicating with a transcription application 118 capable of transcribing utterances 12 spoken by the user 10. In this example, the spoken utterance 12 of the user 10 is "What time is the concert tonight?" This question from the user 10 is a spoken utterance 12 captured by the audio capture device 116a and processed by audio subsystems 116 of the user device 110. In this example, the speech recognizer 200 of the user device 110 receives the audio input 202 (e.g., as acoustic frames) of "what time is the concert tonight" and transcribes the audio input 202 into a transcription 204 (e.g., a text representation of "what time is the concert tonight?"). Here, the transcription application 118 labels each word of the transcription 204 with corresponding start and end times based on word timings 206 generated by the speech recognizer 200. For instance, with these start and end times, the user 10 is able to edit the transcription 204 or audio corresponding to the transcription 204. In some examples, the transcription application 118 corresponds to a video transcription application that is configured to edit and/or to process audio/video data on the user device 110 based on, for example, the start and the end times that the speech recognizer 200 associates with the words of the transcription 204.

FIG. 1B is another example of speech recognition with the speech recognizer 200. In this example, the user 10 associated with the user device 110 is communicating with a friend named Jane Doe with a communication application 118. Here, the user 10 named Ted, communicates with Jane by having the speech recognizer 200 transcribe his voice inputs. The audio capture device 116 captures these voice inputs and communicates them in a digital form (e.g., acoustic frames) to the speech recognizer 200. The speech recognizer 200 transcribes these acoustic frames into text that is sent to Jane via the communication application 118. Because this type of application 118 communicates via text, the transcription 204 from the speech recognizer 200 may be sent to Jane without further processing (e.g., natural language processing). Here, the communication application 118, using the speech recognizer 200, may associate times with one or more portions of the conversation. Depending on the communication application 118, these times may be quite detailed corresponding to word timings 206 for each word of the conversation (e.g., a start time and an end time for each word) processed by the speech recognizer 200 or more generally correspond to times associated with portions of the conversation by each speaker (e.g., as shown in FIG. 1B).

FIG. 1C depicts a conversation much like FIG. 1B, but a conversation with an voice assistant application 118. In this example, the user 10 asks the automated assistant, "What time is the concert tonight?" This question from the user 10 is a spoken utterance 12 captured by the audio capture device 116a and processed by audio subsystems 116 of the user device 110. In this example, the speech recognizer 200 of the user device 110 receives the audio input 202 (e.g., as acoustic frames) of "what time is the concert tonight" and transcribes the audio input 202 into a transcription 204 (e.g., a text representation of "what time is the concert tonight?"). Here, the automated assistant of the application 118 may respond to the question posed by the user 10 using natural language processing. Natural language processing generally refers to a process of interpreting written language (e.g., the transcription 204) and determining whether the written language prompts any action. In this example, the automated assistant uses natural language processing to recognize that the question from the user 10 regards the user's schedule and more particularly a concert on the user's schedule. By recognizing these details with natural language processing, the automated assistant returns a response to the user's query where the response states, "Doors open at 8:30 pm for the concert tonight." In some configurations, natural language processing occurs on a remote system in communication with the data processing hardware 112 of the user device 110. Similar to FIG. 1B, the speech recognizer 200 may emit times (e.g., word timings 206) that the voice assistant application 118 may use to provide additional details about the conversation between the user 10 and the automated assistant. For instance, FIG. 1C illustrates the voice assistant application 118 labeling the user's question with the time when it occurred.

Figure 2:
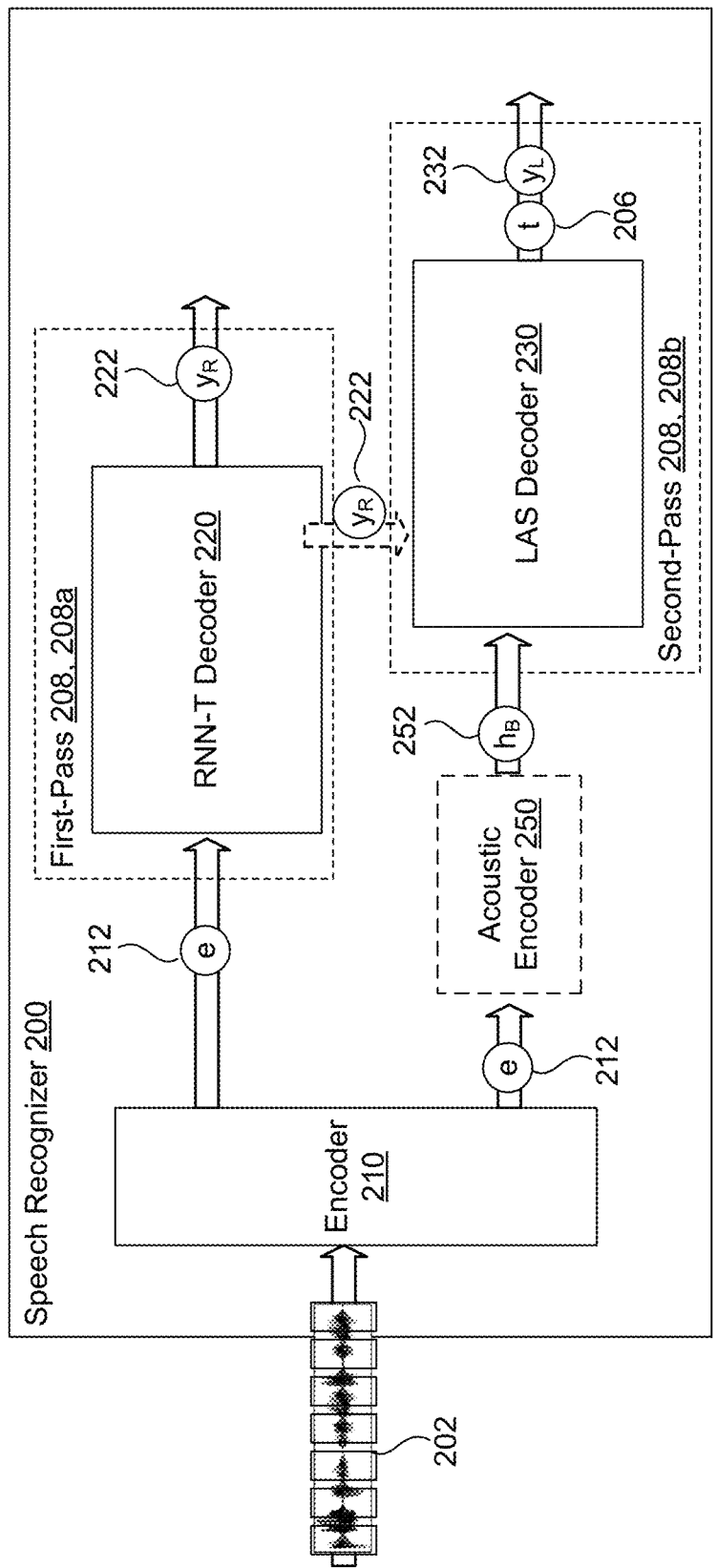
FIG. 2 is a schematic view of an example two-pass architecture for speech recognition.

In some examples, such as FIG. 2, the speech recognizer 200 is configured in a two-pass architecture. Generally speaking, the two-pass architecture of the speech recognizer 200 includes at least one encoder 210, an RNN-T decoder 220, and a LAS decoder 230. In two-pass decoding, a second pass 208, 208b (e.g., shown as the LAS decoder 230) may improve the initial outputs from a first pass 208, 208a (e.g., shown as the RNN-T decoder 220) with techniques such as lattice rescoring or n-best re-ranking. In other words, the RNN-T decoder 220 produces streaming predictions and the LAS decoder 230 finalizes the prediction. Here, specifically, the LAS decoder 230 rescores streamed hypotheses $y_R$ from the RNN-T decoder 220. Although it is generally discussed that the LAS decoder 230 functions in a rescoring mode that rescores streamed hypotheses $y_R$ from the RNN-T decoder 220, the LAS decoder 230 is also capable of operating in different modes, such as a beam search mode, depending on design or other factors (e.g., utterance length).

The at least one encoder 210 is configured to receive, as an audio input 202, acoustic frames corresponding to streaming spoken utterances 12. The acoustic frames may be previously processed by the audio subsystem 116 into parameterized acoustic frames (e.g., mel frames and/or spectral frames). In some implementations, the parameterized acoustic frames correspond to log-mel filterbank energies with log-mel features. For instance, the parameterized input acoustic frames that are output by the audio subsystem 116 and that are input into the encoder 210 may be represented as $x=(x_1, \ldots, x_T)$, where $x_t \in \mathbb{R}^d$ are log-mel filterbank energies, T denotes the number of frames in x, and d represents the number of log-Mel features. In some examples, each parameterized acoustic frame includes 128-dimensional log-mel features computed within a short shifting window (e.g., 32 milliseconds and shifted every 10 milliseconds). Each feature may be stacked with previous frames (e.g., three previous frames) to form a higher-dimensional vector (e.g., a 512-dimensional vector using the three previous frames). The features forming the vector may then be downsampled (e.g., to a 30 millisecond frame rate). Based on the audio input 202, the encoder 210 is configured to generate an encoding e. For example, the encoder 210 generates encoded acoustic frames (e.g., encoded mel frames or acoustic embeddings).

Although the structure of the encoder 210 may be implemented in different ways, in some implementations, the encoder 210 is a long-short term memory (LSTM) neural network. For instance, the encoder 210 includes eight LSTM layers. Here, each layer may have 2,048 hidden units followed by a 640-dimensional projection layer. In some examples, a time-reduction layer is inserted with the reduction factor N=2 after the second LSTM layer of encoder 210 (e.g., ensure that encoded features occur at a particular frame rate).

In some configurations, the encoder 210 is a shared encoder network. In other words, instead of each pass network 208 having its own separate encoder, each pass 208 shares a single encoder 210. By sharing an encoder, an ASR speech recognizer 200 that uses a two-pass architecture may reduce its model size and/or its computational cost. Here, a reduction in model size may help enable the speech recognizer 200 to function well entirely on-device.

In some examples, the speech recognizer 200 of FIG. 2 also includes an additional encoder, such as the acoustic encoder 250, to adapt the encoder 210 output 212 to be suitable for the second pass 208b of the LAS decoder 230. The acoustic encoder 250 is configured to further encode the output 212 into the encoded output 252. In some implementations, the acoustic encoder 250 is a LSTM encoder (e.g., a two-layer LSTM encoder) that further encodes the output 212 from the encoder 210. By including an additional encoder, the encoder 210 may still be preserved as a shared encoder between passes 208.

During the first pass 208a, the encoder 210 receives each acoustic frame of the audio input 202 and generates an output 212 (e.g., shown as the encoding e of the acoustic frame). The RNN-T decoder 220 receives the output 212 for each frame and generates an output 222, shown as the hypothesis $y_R$, at each time step in a streaming fashion. In some implementations, the RNN-T decoder 220 includes a prediction network and a joint network. Here, the prediction network may have two LSTM layers of 2,048 hidden units and a 640-dimensional projection per layer as well as an embedding layer of 128 units. The outputs 212 of the encoder 210 and the prediction network may be fed into the joint network that includes a softmax predicting layer. In some examples, the joint network of the RNN-T decoder 220 includes 640 hidden units followed by a softmax layer that predicts 4,096 mixed-case word pieces.

In the two-pass model of FIG. 2, during the second pass 208b, the LAS decoder 230 receives the output 212 from the encoder 210 for each frame and generates an output 232 designated as the hypothesis $y_L$. When the LAS decoder 230 operates in a beam search mode, the LAS decoder 230 produces the output 232 from the output 212 alone; ignoring the output 222 of the RNN-T decoder 220. When the LAS decoder 230 operates in the rescoring mode, the LAS decoder 230 obtains the top-K hypotheses from the RNN-T decoder 220 and then the LAS decoder 230 is run on each sequence in a teacher-forcing mode, with attention on the output 212, to compute a score. For example, a score combines a log probability of the sequence and an attention coverage penalty. The LAS decoder 230 selects a sequence with the highest score to be the output 232. Here, in the rescoring mode, the LAS decoder 230 may include multi-headed attention (e.g., with four heads) to attend to the output 212. Furthermore, the LAS decoder 230 may be a two-layer LAS decoder 230 with a softmax layer for prediction. For instance, each layer of the LAS decoder 230 has 2,048 hidden units followed by a 640-dimnesional projection. The softmax layer may include 4,096 dimensions to predict the same mixed-case word pieces from the softmax layer of the RNN-T decoder 220.

Generally speaking, the two-pass model of FIG. 2 without any additional constraints has difficulty detecting word timings 206. This difficulty exists, at least in part, because the two-pass model tokenizes or divides a word into one or more word pieces. Here, for example, when a single word piece corresponds to an entire word, the start time and the end time for the entire word coincide with the start time and the end time for the single word piece. Yet when a word consists of multiple word pieces, the start time for the word may correspond to one word piece while the end time for the word corresponds to a different word piece. Unfortunately, a traditional two-pass model therefore may struggle to identify when a word begins and when the word ends based on word pieces. To overcome these issues, the two-pass model may be trained with particular limitations as to the alignments of the word pieces with respect to a start time and an end time for a given word of a training example.

Figure 3A:
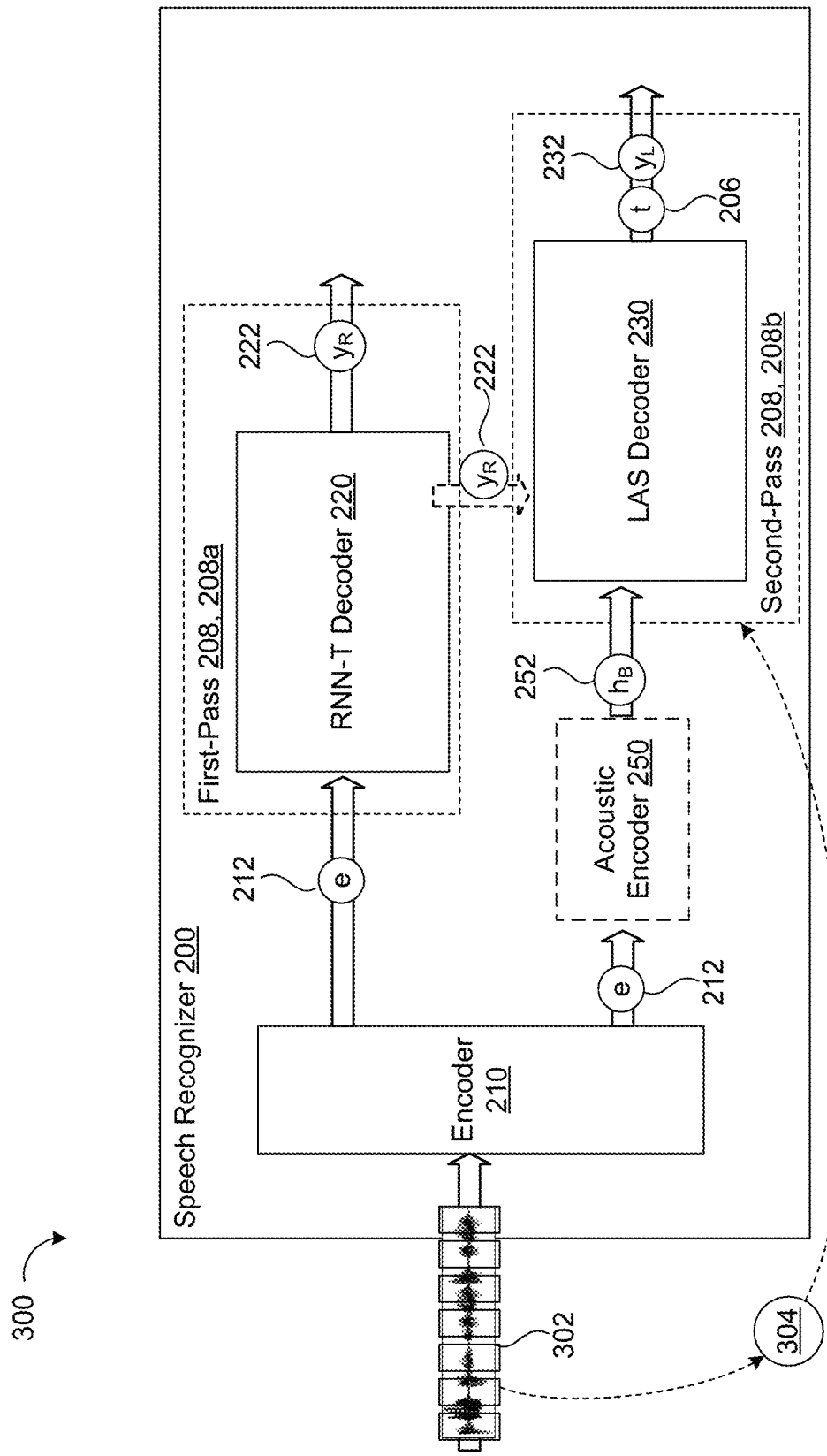
FIG. 3A is a schematic view of an example training process for the two-pass architecture of FIG. 2 for speech recognition.
Figure 3B:
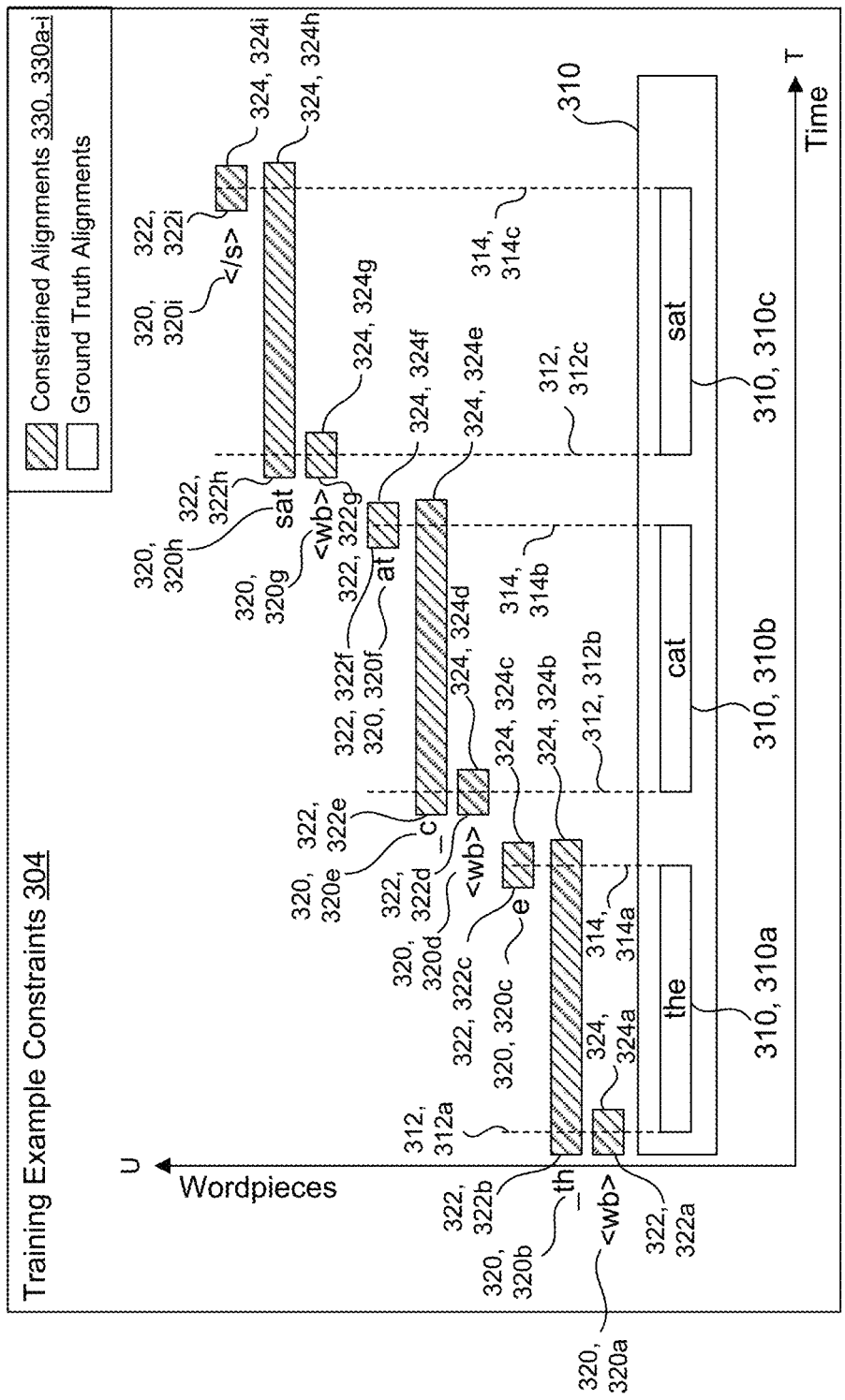
FIG. 3B is a schematic view of example constraints in a training example for the training process of FIG. 3A.

A traditional training process for a two-pass model of FIG. 2 may occur in two stages. During the first stage, the encoder 210 and the RNN-T decoder 220 are trained to maximize $\hat{P}(y_R=y|x)$. In the second stage, the encoder 210 is fixed and the LAS decoder 230 is trained to maximize $\hat{P}(y_L=y|x)$. When the two-pass model includes the additional encoder 250, the additional encoder 250 trains to maximize $\hat{P}(y_L=y|x)$ in the second stage while the encoder 210 is fixed. Yet as shown by FIGS. 3A and 3B, the traditional training process may be adapted to a training process 300 that includes additional constraints on the LAS decoder 230. For instance, the training process 300 constrains an attention head of the LAS decoder 230 (e.g., one attention head of a plurality of attention heads at the LAS decoder 230) to generate an attention probability that indicates word timings 206 that correspond to the output 232 of the second pass 208b. In some configurations, by including this additional constraint, the training process 300 trains to minimize a standard cross entropy loss at the LAS decoder 230 as well as to minimize an attention alignment loss for the LAS decoder 230 (e.g., an attention alignment loss for the attention head of the LAS decoder 230).

In some examples, such as FIGS. 3A and 3B, a training process 300 trains the two-pass model architecture 200 on a plurality of training examples 302 that each include audio data representing a spoken utterance and a corresponding ground-truth transcription of the spoken utterance. For each word of a corresponding spoken utterance, the corresponding training example 302 also includes a ground truth start time 312 for the word, a ground truth end time 314 for the word, and constraints 304 indicating where each wordpiece in the word emitting from the LAS decoder 230 should occur. The training process 300 may execute on a system 500 (FIG. 5) to train the speech recognizer 200. The trained speech recognizer 200 may be deployed to run on the user device 110 of FIGS. 1A-1C. Optionally, the trained speech recognizer 200 may run on the system 500 or another system in communication with the user device 110. The training process 300 uses the constraints 304 of the training examples 302 to teach the two-pass model to generate (or to insert) a placeholder symbol before each word 310 to indicate the beginning of the respective word 310 in the utterance and/or a placeholder symbol after the last word 310 of a spoken utterance 12. In some configurations, the placeholder symbol is a word boundary <wb> word piece 320 (e.g., shown as word pieces 320, 320a,d,g) before each word 310 and/or an utterance boundary </s> word piece 320 after the last word 310 of an utterance 12. Through training examples 302 with placeholder symbols corresponding to the words 310, the two-pass model learns to include a placeholder symbol as a word piece 320 during its generation of the transcription 204. With the two-pass model trained to generate a boundary word piece 320 (e.g., the word boundary <wb> and/or the utterance boundary </s>) during inference (i.e., use of the two-pass model), the boundary word piece 320 enables the speech recognizer 200 to have further details in order to determine word timings 206.

In order to emit word timings 206 from a two-pass model that uses word pieces 320, the two-pass model is configured to focus on the particular word piece(s) that corresponds to a beginning of a respective word 310 or an ending of the respective word 310. More particularly, the training process 300 wants to constrain a first word piece 320 that corresponds to the beginning of the respective word 310 to occur as close as possible to the beginning of an alignment 312 for the respective word 310 and to constrain a last word piece 320 that corresponds to the ending of the respective word 310 to occur as close as possible to the ending of the alignment 314 for the respective word 310. Here, the constraints 304 constrain all other word pieces 320 that make up the word 310 to occur anywhere within the bounds of the ground truth start time 312 and the ground truth end time 314 of the word 310.

Referring to FIG. 3B, during the training process 300, the LAS decoder 230 is trained using training examples 302 that include training example constraints 304. As discussed above, the training example constraints 304 are configured to constrain a first word piece 320 that corresponds to the beginning of the respective word 310 to occur as close as possible to the beginning of an alignment for the respective word 310 and to constrain a last word piece 320 that corresponds to the ending of the respective word 310 to occur as close as possible to the ending of the alignment for the respective word 310. To illustrate, FIG. 3B depicts a simple training example 302 with three words 310, 310a-c, "the cat sat." Here, each word 310 of the training example 302 has a known ground truth alignment with a ground truth alignment start time 312 and a ground truth alignment end time 314. In FIG. 3B, the first word 310a, "the," has a first ground truth start time 312, 312a and a first ground truth end time 314, 314a. The second word 310b, "cat," has a second ground truth start time 312, 312b and a second ground truth end time 314, 314b. The third word 310c, "sat," has a third ground truth start time 312, 312c and a third ground truth end time 314, 314c.

Based on the ground truth alignments 312, 314 for each word 310, the training example 302 includes training example constraints 304 that constrain each word piece 320 corresponding to a word 310 to be aligned with the ground truths alignments 312, 314. Here, the first word 310a, "the," includes three word pieces 320, 320a-c: a first word piece 320a that is a boundary word piece 320 (e.g., shown as <wb>); a second word piece 320b, "_th;" and a third word piece 320c, "e." The second word 310b, "cat," includes three word pieces 320, 320d-f: a fourth word piece 320d that is a boundary word piece 320 (e.g., shown as <wb>); a fifth word piece 320e, "_c;" and a sixth word piece 320f, "at." The third word 310c, "sat," includes three word pieces 320, 320g-i: a seventh word piece 320g that is a boundary word piece 320 (e.g., shown as <wb>); an eighth word piece 320h, "sat;" and a ninth word piece 320i that is an utterance boundary 320 (e.g., shown as </s>).

The training process 300 is configured to determine which word piece 320 of a respective word 310 corresponds to the beginning of the respective word 310 (i.e., a beginning word piece) and which word piece 320 of the respective word 310 corresponds to the ending of the respective word 310 (i.e., an ending word piece). For instance, in the example of FIG. 3B, the training process 300 determines that the first word piece 320a is the beginning word piece for the first word 310a, the fourth word piece 320d is the beginning word piece for the second word 310b, and the seventh word piece 320g is the beginning word piece for the third word 310c. Likewise, the training process 300 determines that the third word piece 320c is the ending word piece for the first word 310a, the sixth word piece 320f is the ending word piece for the second word 310b, and the ninth word piece 320i is the ending word piece for the third word 310c. In some examples, the beginning word piece 320 and the ending word piece 320 are the same word piece 320 because a particular word 310 includes only one word piece 320.

Once the training process 300 determines the beginning word piece and the ending word piece for each word 310 in a training example 302, the training process 300 is configured to generate a constrained alignment 330 for each of the beginning word piece 320 and the ending word piece 320. In other words, the training process 300 generates alignment constraints that aim to establish when a particular word piece 320 should occur during an index of time based on the timing of the ground truth alignments 312, 314. In some implementations, the constrained alignment 330 for a word piece 320 spans an interval of time ranging from a word piece starting time 322 to a word piece ending time 324. When the word piece 320 is the beginning word piece 320 for a word 310, the beginning word piece 320 has a constrained alignment 330 aligned with the ground truth alignment start time 312. For instance, the constrained alignment 330 for the beginning word piece 320 spans an interval of time centered about the ground truth alignment start time 312. On the other hand, when the word piece 320 is the ending word piece 320 for the word 310, the ending word piece 320 has a constrained alignment 330 aligned with the ground truth alignment end time 314. For example, the constrained alignment 330 for the ending word piece 320 spans an interval of time centered about the ground truth alignment start time 312. When the word piece 320 corresponds to neither the beginning word piece 320 nor the ending word piece 320, the word piece 320 may have a constrained alignment 330 that corresponds to an interval of time ranging from the ground truth alignment start time 312 to the ground truth alignment end time 314. In other words, the training example constraints 304 indicate that a word piece 320 that does not correspond to either the beginning word piece 320 or the ending word piece 320 may occur at any point in time between when the ground truth occurred for the word 310 corresponding to the word piece 320.

In some configurations, the training process 300 includes tunable constrained alignments 330. Stated differently, the word piece starting time 322 and/or the word piece ending time 324 may be adjusted to define different intervals of time about the ground truth alignment 312, 314. Here, the interval of time may be referred to as a timing buffer such that the timing buffer includes a first period of time before the ground truth alignment 312, 314 and a second period of time after the ground truth alignment 312, 314. In other words, the first period of time of the timing buffer is equal to a length of time between the word piece starting time 322 and the ground truth alignment 312, 314 and the second period of time of the timing buffer is equal to a length of time between the word piece ending time 324 and the ground truth alignment 312, 314. By tuning the timing buffer, the training example constraints 304 may optimize the WER for the two-pass model while attempting to minimize the latency. For example, experimentation with the timing buffer has resulted in a timing buffer of about 180 milliseconds being more optimal with respect to the WER and the latency than a timing buffer of 60 milliseconds or 300 milliseconds.

In some examples, the training process 300 applies the constrained alignments 330 (e.g., the constrained alignments 330, 330a-i) to the attention mechanism associated with the LAS decoder 230. In other words, the training process 300 trains the LAS decoder 230 (e.g., an attention head of the LAS decoder 230) using the one or more training examples 302 that include training example constraints 304. In some implementations, although the LAS decoder 230 includes multiple attention heads, the training process 300 constrains one or less than all of the attention heads of the LAS decoder 230 in order to allow one or more attention heads to be operate unconstrained. Here, during the training process 300, the constrained attention head generates attention probabilities for each training example 302. When the attention probability generated by the attention head corresponds to a constrained alignment 330, the training process 300 is configured to compare the attention probability to an expected attention probability for the training example 302 at the constrained alignment 330. In some configurations, the training example constraints 304 indicate an expected attention probability for a constrained alignment 330 of each word piece 320. For instance, the expected probability for a constrained alignment 330 between a word piece starting time 322 and a word piece ending time 324 is set to a high or non-zero value (e.g., a value of one) to indicate that an alignment of a word piece 320 occurs at an allowable time (i.e., within the constrained alignment 330). In some examples, the training example 302 includes an expected attention probability that is set to a low or zero value to indicate that an alignment of a word piece 320 occurs at an alignment time that is not allowable (e.g., not within the constrained alignment 330). When, during the training process 300, the attention probability fails to match or to satisfy the expected attention probability, the training process 300 is configured to apply a training penalty to the constrained attention head. In some examples, the training process 300 applies the training penalty such that the training penalty minimizes an attention loss for the LAS decoder 230 during training. In some examples, the attention loss is represented by the follow equation:

$$\mathcal{L}_{attention} = \beta * \sum_{t=1}^{T}\sum_{u=1}^{U} a(u, t) * (1 - c(u, t)) \qquad (1)$$

where $\beta$ is a hyperparameter controlling a weight of the attention loss $\mathcal{L}_{attention}$, u corresponds to a word piece unit such that $u \in U$, t corresponds to a time such that $t \in T$, c(u, t) corresponds to the training example constraints 304 for each word piece unit u over time t, and a(u, t) corresponds to the attention of the constrained attention head for each word piece unit u over time t. Additionally or alternatively, the training process 300 may apply the training penalty to minimize the overall loss for the LAS decoder 230 during training where the overall loss is represented by the following equation:

$$\mathcal{L}_{overall} = \mathcal{L}_{attention} + \mathcal{L}_{LAS} \qquad (2)$$

By applying a training penalty, the training process 300, over multiple training examples 302, teaches the constrained attention head of the LAS decoder 230 to have a maximum attention probability for each word piece 320 at a time corresponding to when the word piece 320 occurs in time. For instance, once training process 300 trains the two-pass model, during decoding, the LAS decoder 230 operates a beam search that emits a word piece unit u at each step in the beam search. Here, the speech recognizer 200 determines the word piece timing for each word piece unit u by finding the index of time that results in a maximum constrained attention head probability for this particular word piece unit u. From the word piece timing, the actual word timing 206 may be derived. For example, the word piece timing for the boundary word pieces 320 corresponds to a beginning of a word 310 and an ending of a word 310. Here, a beginning word piece 320 for a word 310 (e.g., the word boundary <wb> word piece 320) will have a timing corresponding to the start time of a respective word 310 and an ending word piece 320 of the respective word 310 (e.g., shown in FIG. 3B as the utterance boundary </s> word piece 320) will have a timing corresponding to the end time of the respective word 310. In other words, the speech recognizer 200 may determine that the actual word timings 206 (e.g., the start time of a word 310 and an end time of a word 310) are equal to the word piece timings for the beginning word piece 320 and the ending word piece 320. Based on this determination, the speech recognizer 200 is configured to generate word timings 206 for words output by the speech recognizer 200 (e.g., as shown in FIGS. 1A-1C).

Figure 4:
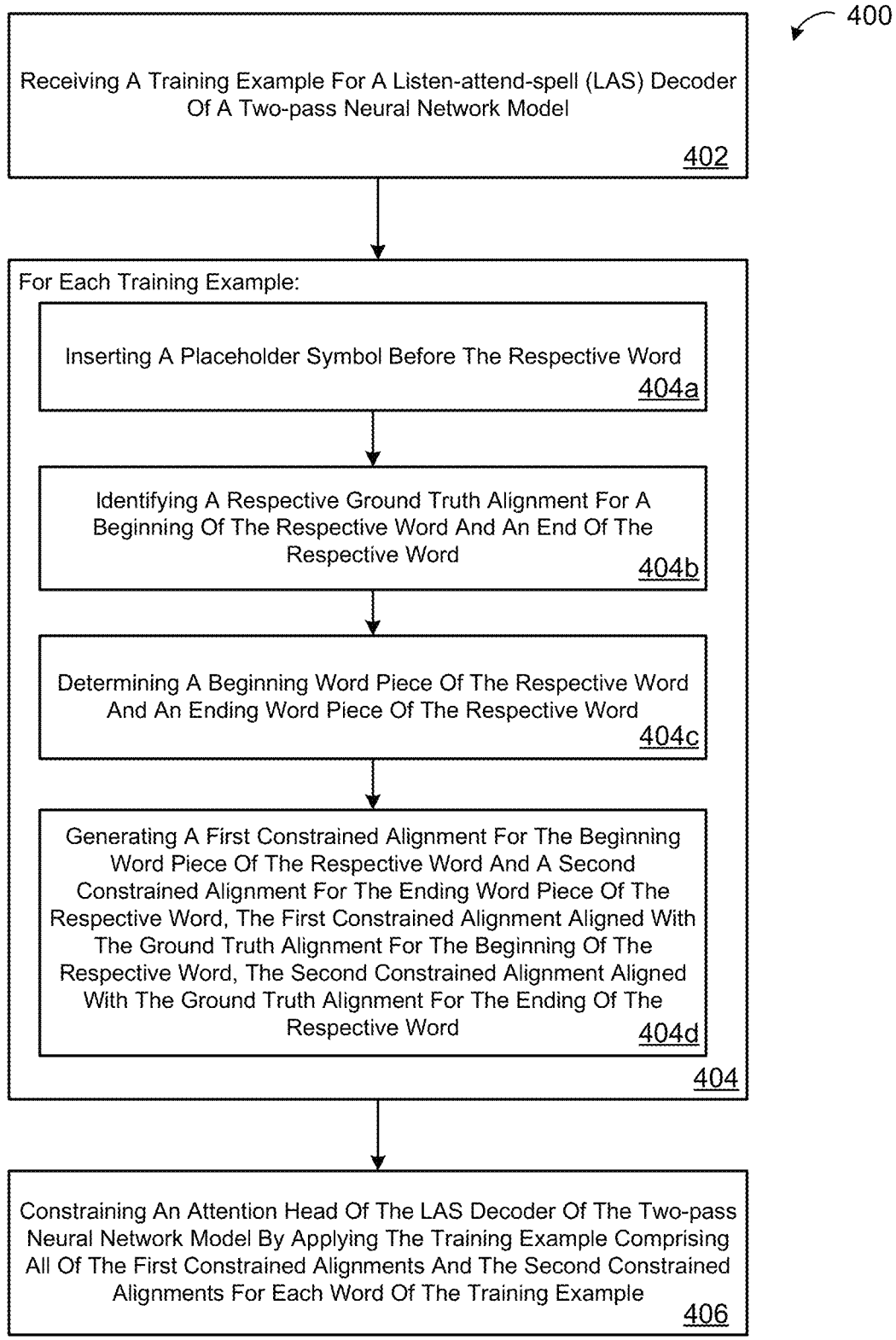
FIG. 4 is a flowchart of an example arrangement of operations for a method of implementing the two-pass architecture of FIG. 2 incorporating constrained attention.

FIG. 4 is a flowchart of an example arrangement of operations for a method 400 of implementing a speech recognizer 200 with constrained attention. At operation 402, the method 400 receives a training example 302 for a LAS decoder 230 of a two-pass neural network model. At operation 404, the method 400 performs operations 404, 404a-d for each word 310 of the training example 302. At operation 404a, the method 400 inserts a placeholder symbol before the respective word 310. At operation 404b, the method 400 identifies a respective ground truth alignment 312, 314 for a beginning of the respective word 310 and an end of the respective word 310. At operation 404c, the method 400 determines a beginning word piece 320 of the respective word 310 and an ending word piece 320 of the respective word 310. At operation 404d, the method 400 generates a first constrained alignment 330 for the beginning word piece 320 of the respective word 310 and a second constrained alignment 330 for the ending word piece 320 of the respective word 310. Here, the first constrained alignment 330 is aligned with the ground truth alignment 312, 314 for the beginning of the respective word 310 (e.g., the ground truth alignment start time 312) and the second constrained alignment 330 is aligned with the ground truth alignment 312, 314 for the ending of the respective word 310 (e.g., the ground truth alignment end time 314). At operation 406, the method 400 constrains an attention head of the LAS decoder 230 of the two-pass neural network model by applying the training example 302 including all of the first constrained alignments 330 and the second constrained alignments 330 for each word 310 of the training example 302.

Figure 5:
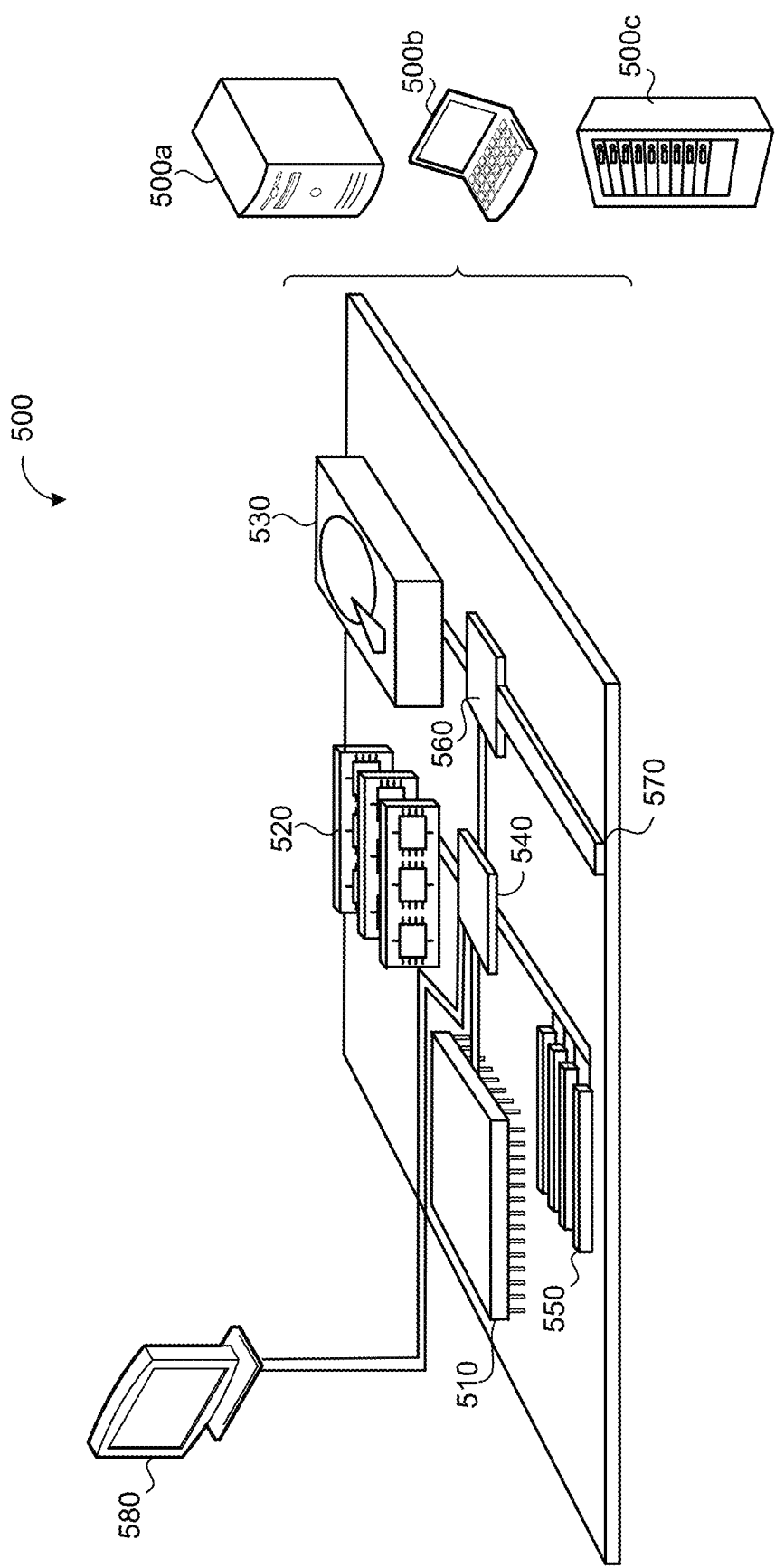
FIG. 5 is a schematic view of an example computing device that may be used to implement the systems and methods described herein.

FIG. 5 is schematic view of an example computing device 500 that may be used to implement the systems (e.g., the speech recognizer 200) and methods (e.g., the training process 300 and/or the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 540, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
    receiving audio data characterizing a spoken utterance;
    encoding, using an encoder of a neural network speech recognition model, the audio data into a sequence of audio encodings,
    processing, using a first decoder of the neural network speech recognition model, the sequence of audio encodings to generate, as output from the first decoder, a plurality of speech recognition hypotheses for the spoken utterance, each speech recognition hypothesis of the plurality of speech recognition hypotheses comprising a corresponding sequence of words;
    for each respective speech recognition hypothesis in the top-K speech recognition hypotheses among the plurality of speech recognition hypotheses generated as output from the first decoder, processing, using a second decoder of the neural network speech recognition model, the corresponding sequence of words of the respective speech recognition hypothesis to compute a respective score;
    selecting, using the second decoder, as a transcription for the spoken utterance, the corresponding sequence of words of the respective speech recognition hypothesis having the highest respective score; and
    determining, using a constrained attention head of the neural network speech recognition model, actual word timings for each word in the corresponding sequence of words selected as the transcription for the spoken utterance.

2. The computer-implemented method of claim 1, wherein the first decoder comprises a prediction network and a joint network.

3. The computer-implemented method of claim 1, wherein:

the first decoder of the neural network speech recognition model comprises a recurrent neural network-transducer (RNN-T) decoder; and the second decoder of the neural network speech recognition model comprises a Listen, Attend, and Spell (LAS) decoder.

4. The computer-implemented method of claim 1, wherein the data processing hardware resides on a user device that captured the spoken utterance in streaming audio.

5. The computer-implemented method of claim 1, wherein the operations further comprise displaying, on a screen in communication with the data processing hardware, the transcription of the spoken utterance, the transcription annotated with the actual word timings determined for each word in the corresponding sequence of words selected as the transcription for the spoken utterance.

6. The computer-implemented method of claim 1, wherein the second decoder comprises a plurality of attention heads.

7. The computer-implemented method of claim 1, wherein determining the actual word timings for each word in the corresponding sequence of words selected as the transcription for the spoken utterance comprises:

determining a time corresponding to a maximum probability at the constrained attention head of the neural network speech recognition model; and generating a word start time or a word end time for the determined time corresponding to a maximum probability at the constrained attention head of the neural network speech recognition model.

8. The computer-implemented method of claim 1, wherein the constrained attention head of the neural network speech recognition model is configured to generate an attention probability that indicates the actual word timings.

9. The computer-implemented method of claim 1, wherein a training process constrains the constrained attention head of the neural network speech recognition model to generate an attention probability that indicates word timings of an output of the neural network speech recognition model.

10. The computer-implemented method of claim 1, wherein the plurality of speech recognition hypotheses generated as output from the first decoder comprise a plurality of streaming speech recognition hypotheses.

11. A system comprising:

data processing hardware; and memory hardware in communication with the data processing hardware, the memory hardware storing instructions that when executed on the data processing hardware cause the data processing hardware to perform operations comprising:

receiving audio data characterizing a spoken utterance;

encoding, using an encoder of a neural network speech recognition model, the audio data into a sequence of audio encodings, processing, using a first decoder of the neural network speech recognition model, the sequence of audio encodings to generate, as output from the first decoder, a plurality of speech recognition hypotheses for the spoken utterance, each speech recognition hypothesis of the plurality of speech recognition hypotheses comprising a corresponding sequence of words;

for each respective speech recognition hypothesis in the top-K speech recognition hypotheses among the plurality of speech recognition hypotheses generated as output from the first decoder, processing, using a second decoder of the neural network speech recognition model, the corresponding sequence of words of the respective speech recognition hypothesis to compute a respective score;

selecting, using the second decoder, as a transcription for the spoken utterance, the corresponding sequence of words of the respective speech recognition hypothesis having the highest respective score; and determining, using a constrained attention head of the neural network speech recognition model, actual word timings for each word in the corresponding sequence of words selected as the transcription for the spoken utterance.

12. The system of claim 11, wherein the first decoder comprises a prediction network and a joint network.

13. The system of claim 11, wherein:

the first decoder of the neural network speech recognition model comprises a recurrent neural network-transducer (RNN-T) decoder; and the second decoder of the neural network speech recognition model comprises a Listen, Attend, and Spell (LAS) decoder.

14. The system of claim 11, wherein the data processing hardware resides on a user device that captured the spoken utterance in streaming audio.

15. The system of claim 11, wherein the operations further comprise displaying, on a screen in communication with the data processing hardware, the transcription of the spoken utterance, the transcription annotated with the actual word timings determined for each word in the corresponding sequence of words selected as the transcription for the spoken utterance.

16. The system of claim 11, wherein the second decoder comprises a plurality of attention heads.

17. The system of claim 11, wherein determining the actual word timings for each word in the corresponding sequence of words selected as the transcription for the spoken utterance comprises:

determining a time corresponding to a maximum probability at the constrained attention head of the neural network speech recognition model; and generating a word start time or a word end time for the determined time corresponding to a maximum probability at the constrained attention head of the neural network speech recognition model.

18. The system of claim 11, wherein the constrained attention head of the neural network speech recognition model is configured to generate an attention probability that indicates the actual word timings.

19. The system of claim 11, wherein a training process constrains the constrained attention head of the neural network speech recognition model to generate an attention probability that indicates word timings of an output of the neural network speech recognition model.

20. The system of claim 11, wherein the plurality of speech recognition hypotheses generated as output from the first decoder comprise a plurality of streaming speech recognition hypotheses.

* * * * *